(12) United States Patent
Sirgany

(10) Patent No.: US 6,941,365 B2
(45) Date of Patent: Sep. 6, 2005

(54) COMPUTER RESOURCE ALLOCATION LAYOUT DESCRIPTION

(75) Inventor: Wadie Sirgany, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 833 days.

(21) Appl. No.: 09/897,088

(22) Filed: Jul. 3, 2001

(65) Prior Publication Data

US 2002/0016785 A1 Feb. 7, 2002

Related U.S. Application Data (60) Provisional application No. 60/221,328, filed on Jul. 28, 2000.

(51) Int. Cl.[7] ............................................. G06F 15/173
(52) U.S. Cl. ....................... 709/223; 709/226; 718/102; 718/104; 718/105; 702/81
(58) Field of Search ................................ 709/223, 226; 718/102, 104, 105; 702/81; 705/7, 10

(56) References Cited

U.S. PATENT DOCUMENTS

| | | | | |
|---|---|---|---|---|
| 4,958,375 A | * | 9/1990 | Reilly et al. ................. | 382/159 |
| 5,606,543 A | * | 2/1997 | Sugiyama .............. | 369/124.09 |
| 5,752,028 A | * | 5/1998 | Ellacott ................... | 707/103 R |
| 5,870,396 A | * | 2/1999 | Abu-Amara et al. ........ | 370/413 |
| 5,872,972 A | | 2/1999 | Boland et al. | |
| 6,003,101 A | | 12/1999 | Williams | |
| 6,477,144 B1 | * | 11/2002 | Morris et al. ............ | 370/230.1 |
| 6,529,934 B1 | * | 3/2003 | Kawamura et al. ......... | 718/102 |
| 6,757,730 B1 | * | 6/2004 | Lee et al. ................... | 709/226 |
| 6,757,897 B1 | * | 6/2004 | Shi et al. .................... | 718/102 |

OTHER PUBLICATIONS

Silberschatz and Galvin; "Operating System Concepts"; Addison–Wesley Publishing Co.; pp. 141–143.

* cited by examiner

Primary Examiner—Hosain Alam
Assistant Examiner—Liang-che Alex Wang
(74) Attorney, Agent, or Firm—Whitham, Curtis & Christofferson, P.C.

(57) ABSTRACT

The invention discloses a method for maximizing overall system performance among a set of computer systems which periodically run a set of jobs. It is known that some allocations of jobs to computer systems are worse than others where "worse" may mean slower or even that certain jobs are not run. What is not known is how to achieve the best or maximized job mix. However, this invention can select the best from a set of job mixes or some solution which comes within a margin of tolerance for some theoretically ideal maximum. The invention takes a novel approach to bin packing in that the items are initially ordered with most difficult to pack items first. Then, the list of items is reordered using one of a set of percolation techniques. Random processes can also be applied to the list so that from a large set of possible orders, some order will be best relative to other orders if no solution is found within the prespecified tolerance.

16 Claims, 7 Drawing Sheets

COMPUTER RESOURCE ALLOCATION LAYOUT DESCRIPTION

CROSS-REFERENCE TO RELATED APPLICATION

The present application claims priority of Provisional U.S. Application Ser. No. 60/221,328, filed Jul. 28, 2000, the entire disclosure of which is hereby fully incorporated herein by reference.

BACKGROUND OF THE INVENTION

1. Field of the Invention

This invention relates to the field of computer system utilization where a number of jobs are run periodically on a number of computer systems and, more particularly, to a technique for determining some mix of assignments of jobs to particular computers that will result in near-optimal throughput for the entire set of computer systems.

2. Background Description

There is a great deal of art designed to optimize throughput of a workload on a single computer or even a multiprocessor system. Much of the work on throughput optimization was done in the 1960's and little has changed. Jobs are scheduled for execution based upon a variety of factors: job priority, time of residence in the queue, deadlines, start times, facilities usage, and a host of other factors. Early in the history of writing scheduling and dispatching programs, a variety of ways were developed to assure that all jobs will eventually receive a suitable and effective share of the system resources. For example, to avoid a low-priority job being deferred for an excessive period or never reaching execution, a method of "aging" was devised. By this method, the priority of a job might be increased by some amount every time the job is passed over in the queue. Then, because the job's priority increases over time, eventually the job will be run while not significantly affecting performance of jobs of higher priority.

However, the problem becomes very different from job queuing when applied to a system of multiple computers where the issue is how to assign a number of jobs to a number of different computers so that overall system performance is optimized. Queuing or dispatching systems determine how an individual processor will order tasks to receive facilities, etc. rather than allocating a mix of jobs over a plurality of computers in a computer system or set of computer systems which may differ from each other. It is assumed in regard to such a problem that the jobs are to be run on some periodic basis, such as, once a week, or real-time jobs that are constantly executing in a computer. In such a case, it is to be expected that some allocations of jobs to particular computers will work better than others (e.g. with better utilization of available resource, greater throughput and the like). That being the case, there should be some allocation that works as well as or better than all others which would be the optimum allocation or optimum mix, even though performance may not be guaranteed to be optimum in all circumstances or even to satisfy all performance goals.

The problem of allocation of a number of objects among a number of capacities has led to a number of algorithms known as bin packing, which is well-known in the art of operations research. In the conventional process, items are packed into bins based on the unallocated capacities of the various bins. Further, in the conventional approach, the item packing order is fixed, usually by arranging the items in order of decreasing item size. The items are then packed sequentially as arranged using any one of several bin selection rules, such as, first-fit, best-fit, worst-fit, etc.

However, as applied to the packing of software applications (objects) into computers and associated peripherals of a computer system or network (capacities/bins), known bin packing algorithms are ill-suited to finding an optimum solution due to the number of criteria and parameters which characterize the capacities of a computer (e.g. processor and bus architecture, storage, memory and cache capacities and operating protocols therefor, operating systems, peripherals and interfaces and the like) and the variability of processing time for each particular application in regard to those parameters. These criteria and parameters necessarily have multiple and possibly interdependent values such as may be represented by a vector. That is, when packing scalar items into bins (e.g. when consideration is limited to a single attribute, such as, memory requirements only or, more generally, a "size") the efficiency of packing (and bin packing algorithms) relative to bin capacity is closely correlated to item size and largely independent of bin capacity if sufficient to a given item. Therefore, good results are often obtained in scalar packing by ordering items in accordance with size. However, when packing vector items, that is, when consideration is expanded to include more than a single attribute, such as, considering memory capacity and port bandwidth, among others, ordering by increasing or decreasing size does not yield comparably good results since the packing depends on numerous attributes of both items and bin capacities. Moreover, while vector attributes may each be quantified, there are no techniques of quantifying vectors in combination to yield any discernible improvement in performance of bin packing algorithms similar to the use of size in scalar bin packing and any computation to develop a quantitative evaluation would be extremely complex since both individual vectors and each combination corresponding to a respective job or task must be accommodated by the bin packing. Thus bin packing techniques become intractably difficult when plural attributes must be considered and no technique has been developed which can significantly affect the likelihood of finding a good solution or improving the efficiency or effectiveness of a bin packing algorithm for vector packing.

Given a number of computer systems and a number of jobs or "items" to be performed, there are many ways to assign the items to computer systems. As the number of systems and the number of items increases, the number of combinations of items and systems grows rapidly. When the number of systems and the number of items is more than a mere handful, there may be very many ways to allocate the items to the systems. The number may be reduced somewhat when certain items have needs for facilities that may not be available on all of the computer systems. For example, a given item may require more memory than some of the computer systems have. That item must be run, if at all, on a system with sufficient memory. Nevertheless, no system or methodology exists at the present state of the art which provides for determination of an optimal allocation of a plurality of different jobs, particularly jobs having different requirements and different performance characteristics over a plurality of computers or computer systems having different hardware and software attributes.

SUMMARY OF THE INVENTION

It is, therefore, an object of the invention to provide a system and a method for maximizing utilization of a set of computers or computer systems which are used to run a set of jobs ("items") periodically.

It is another object of the invention to provide a system and method for packing a number of jobs into a number of computer systems such that the resulting arrangement or mix is optimal with respect to time, facilities, or other criteria.

It is a further object of the invention to provide a system and method for determining an allocation of a mix of jobs among a plurality of computers or computer systems which better meets a group of goals than other allocations of jobs among the plurality of computers or computer systems.

In order to achieve the above objects, a computerized system for packing a plurality of items into a plurality of computer systems to maximize overall system utilization, the system comprising a computer and an executable program with instructions to implement a method comprising steps of packing items into the plurality of computer systems by sorting the items into an estimated order of difficulty of packing said items into the computer systems, continuing the packing until as many items as possible have been packed, reordering the estimated order of difficulty using a percolation method until a limit cycle occurs or the packed items run on the computer systems according to a pre-specified goal and reordering the estimated order of difficulty using a randomizing method.

In accordance with another aspect of the invention, a method of allocating jobs among a plurality of resources is provided comprising steps of packing items into a plurality of computer system resources by sorting the items into an estimated order of difficulty of packing said items into the computer system resources, continuing the packing until as many items as possible have been packed, reordering the estimated order of difficulty using a percolation method until a limit cycle occurs or the packed items run on the computer systems according to a pre-specified goal and reordering the estimated order of difficulty using a randomizing method.

The invention simultaneously estimates the difficulty of packing of a given item by determination of items for which a bin packing algorithm fails most often such that packing difficulty need not be quantitatively evaluated while simultaneously attempting to satisfy hierarchically prioritized goals and reorders items in approximate decreasing order of packing difficulty by a combination of percolation and random reordering techniques. The number of objectives met by a solution meeting a particular hierarchically prioritized goal is then increased, if possible, by perturbation handling to result in an allocation of items to resources which is at least as good as any other that can be found within practical constraints on the process

BRIEF DESCRIPTION OF THE DRAWINGS

The foregoing and other objects, aspects, and advantages will be better understood from the following detailed description of a preferred embodiment of the invention with reference to the drawings, in which.

DETAILED DESCRIPTION OF A PREFERRED EMBODIMENT OF THE INVENTION

The present invention determines a near optimal assignment of items to computers by ordering the items according to difficulty of packing the items jointly with assigning items to systems with sufficient facilities to execute the items. It should be clear that, at any given instant, there may be many systems with sufficient facilities. As items are assigned to computers, however, the facilities are no longer fully available. It is possible for the method to become stalled when enough facilities have been assigned to preclude further assignments of tasks or jobs while significant facilities and processing capacity remains available. In such a case, no computer system can accommodate the remaining item(s) which, if a known bin packing algorithm and an ordering strategy appropriate to scalar packing has been employed, may be highest in order of allocation difficulty or resource requirements, even though the unassigned facilities on the various computers may total well over the amount needed to assign the waiting items to at least one computer. To accommodate this possibility and provide a more thorough search for an optimal solution, the invention further includes reordering the items using any of a variety of reordering methods and deletion of items or jobs which may truncate the search or prevent the determination of an optimal solution in relatively inaccessible locations in the search space.

In essence, the invention exploits an observation by the inventor that ordering by size in scalar bin packing algorithms is, in practical effect, an ordering by packing difficulty. Further, a basic principle of the invention is that while quantification of packing difficulty for vector packing is computationally difficult and appropriate criteria for evaluation of particular vectors have not been developed, a measure of packing difficulty can be inferred, without quantitative evaluation, from the number of iterations of a bin packing algorithm which fail to allocate particular tasks. These unallocated tasks can then be reordered (in descending order of apparent packing difficulty; possibly opposite to the preferred order for scalar packing) by a number of techniques which the inventor has discovered will substantially increase the efficiency of the bin packing algorithm as well as the quality of the result. The result can then be improved in many cases by perturbation processing of exchanges between allocated and unallocated tasks.

One reordering method used by the invention is "percolation". In percolation, items already ordered in order of estimated packing difficulty are reordered as knowledge of apparent packing difficulty is increased. An item that appears more difficult than originally estimated may be moved all or part way to the top of the order and the process restarted. Percolation can be applied multiple times in different ways to result in differing orders of allocation which may reflect difficulty of packing in numerous different ways. As the order of items on the list changes, the mix will change.

Another method of reordering the list is to apply some random technique to arranging the order of items, much as in shuffling a deck of cards. Then, the method is applied again. This also presents a different order of items to be assigned but with no consideration of packing difficulty.

Attempting to satisfy requirements that cannot be satisfied, however, might prevent other items from being assigned. The technique for avoiding this condition is to delete one or more items from the ordered list by moving them to a "relaxed list"; after which the item or items may be reconsidered in a search for exchanges between the current list and the relaxed group (the perturbed mode).

These reordering and item deletion techniques are a distinctive departure of the invention from queueing and bin packing techniques which assume and utilize a certain order of items in accordance with one parameter or only a few parameters of the item and which are used to express the goal of the solution (e.g. maximum items packed, priority between items, and the like). Variance in order of consideration of the items to be packed with differing degrees of importance given to particular parameters in accordance with the invention provides for a far more thorough and efficient search of the search space and a much enhanced likelihood of determination of an optimal solution.

The invention, as noted, is practiced before items are run. This is another distinction between the invention and the prior art. A user or user site is assumed to want to find the item mix that will lead to optimum system usage. What is optimum is determined by the user. It is well-known in the art that it is not always possible to assign all items or to complete all items in a given time frame. Sometimes getting specific items to run ("depth penetration") means accepting a smaller total number of running items and vice-versa. The user may decide that one or the other sacrifice is the one to be made.

Further, it is well-known in the art that it is effectively impossible to prove that a given mix is the absolute optimum mix or even that an optimal mix will satisfy all desired objectives. Thus, rather than set some absolute criterion as the standard for success, a set of hierarchically prioritized "goals", initially comprehensive but progressively eliminating and/or relaxing individual desired criteria, are pre-specified. When such hierarchically prioritized goals are considered in order beginning with the initial objective of satisfying the most comprehensive goal, if one mix comes within the current goal, that condition is considered sufficient to stop the process of searching for an optimal mix. If a current goal cannot be achieved within a pre-established level of effort, the next successive goal is used. Eventually, some goal is reached unless other factors, as described below, terminate the process.

It is important to keep track of the best order to date. At some point, each new attempt will result in solutions that are less optimum. This would indicate that an optimal mix may have been found. To make sure that a given solution is not as good as one run earlier, it is necessary to keep information on earlier solutions.

One problem that can occur involves what are called "limit cycles". It is possible that some ordered lists result in a return to a previous state. This causes a limit cycle of a pattern of previously visited states to repeat indefinitely. Once a limit cycle is reached, the method will not progress closer to the goal. So, the attempt is halted, the list is reordered, and the method restarted.

Although the method will eventually attain one of a progression of objectives and halt, there are provisions to terminate and halt the process to meet other problem constraints. In particular, because the process may be used to arrange an item mix due to be run at a pre-specified time, there must be some way to halt the process at another pre-specified time. It is also possible to halt the process after the process has run a pre-specified length of time or number of iterations. It is also possible to halt the process after a pre-specified proximity of a solution to the goal.

Figure 1:
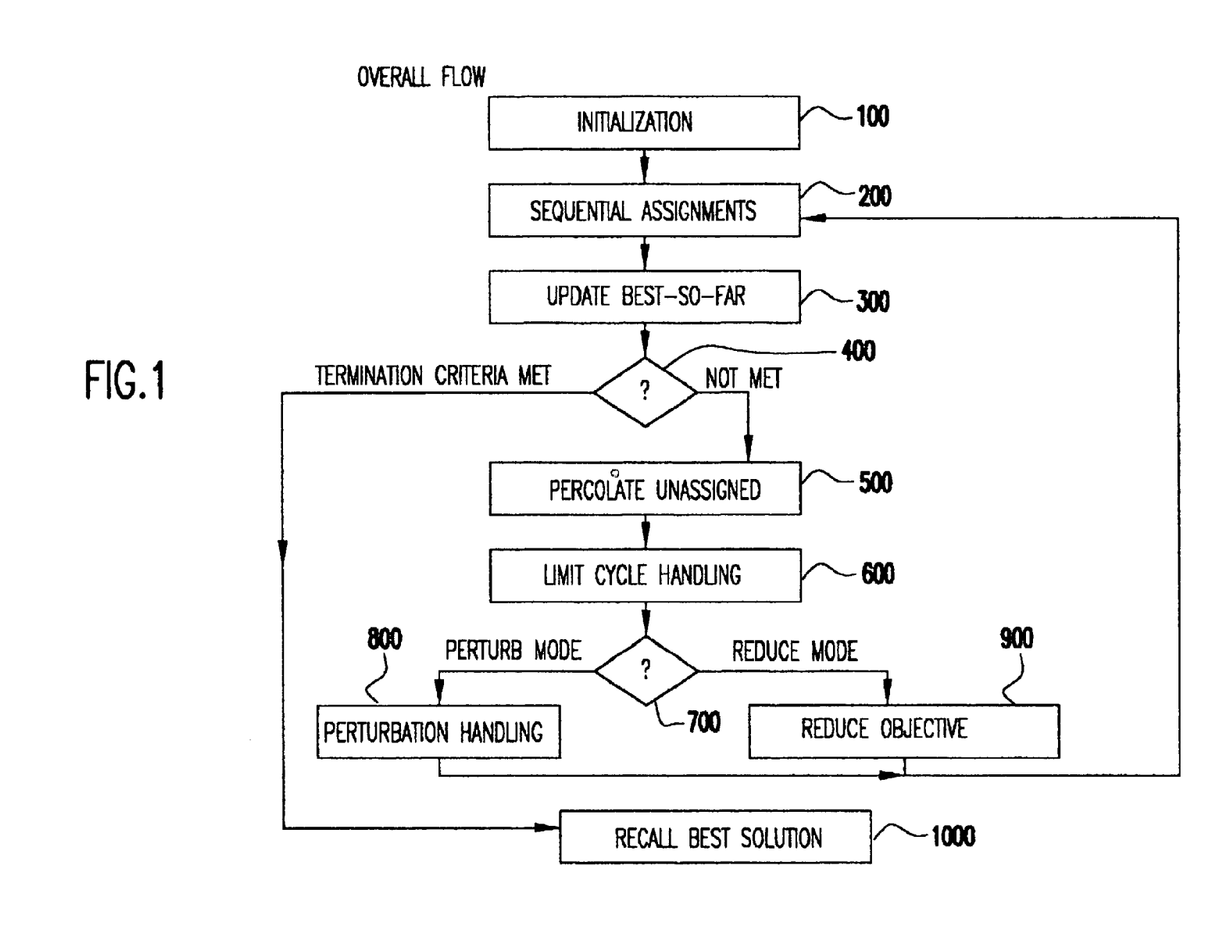
FIG. 1 is a flowchart of the overall method in accordance with the invention.

Referring now to the drawings, and more particularly to FIG. 1, there is shown a general flowchart of the overall method. The method begins with an initialization portion 100 which will be described below with reference to FIG. 2. The basic bin packing algorithm, referred to as a sequential assignments portion 200 is then performed and a solution recorded at 300. At 400 is a node for flow of control references based on termination criteria. Those of ordinary skill in the art are aware of executable code that can be locus for flow of control returns. In order to reach a solution if the process is not terminated, item order is revised by percolation, randomization or the like at 500. Limit cycles are detected at 600 and the process branches at 700 to reduce the objective (900) or attempt to improve the solution (800) and looping back to the bin packing process 200. This node is the point of return from locations 800 and 900 to be described later.

It should be understood that FIGS. 1–7 may be understood either as flow charts (with respect to which they will be discussed) or as high level schematic block diagrams into which general or special purpose data processing hardware is or can be configured to perform the indicated functions, as will be understood by those skilled in the art. For example, the individual operations of FIGS. 2–7 (which are more detailed illustrations of portions of FIG. 1) will be understood by those skilled in the art as representing memory accesses for read and write similar to operations which are available from database software and calculations similar to those available from spreadsheet software run on a general purpose computer which allocates computational resources and memory in the manner of dedicated registers specific to the particular function.

Figure 2:
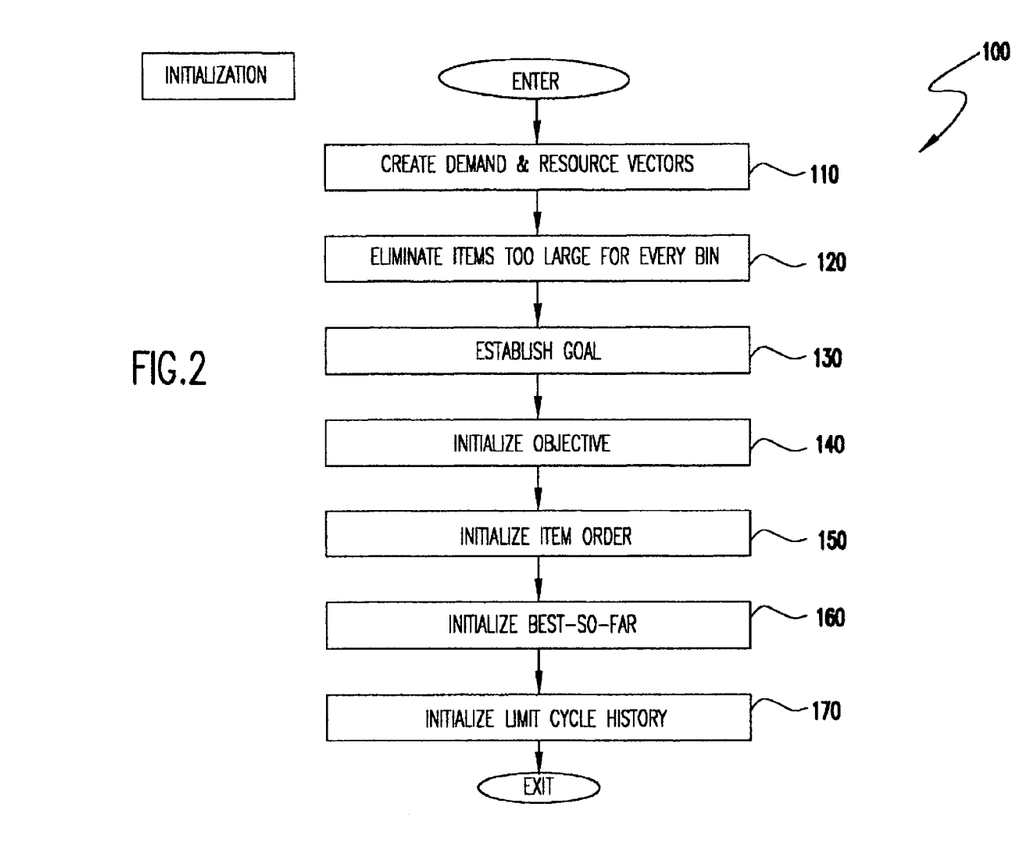
FIG. 2 is a flowchart of the Initialization portion of FIG. 1.

FIG. 2 shows the initialization process 100 in greater detail. The order of the depicted processes is largely non-critical since the principal purpose is to establish initial data conditions from which the subsequent operations 200–900 may proceed. Nevertheless, it is considered preferable to first create demand and resource vectors 110 which may be derived directly from the specifications of hardware requirements of the respective applications or other software items to be allocated and the specifications of respective computers/processors and their peripherals which are available. The former can then be compared against the latter and any items which cannot be allocated (due to insufficient resources on any computer/processor) are eliminated (120). The hierarchically prioritized goal(s) are then stored (130) and the objective (e.g. the most comprehensive list of desired criteria) is initialized (140). An item order is established at step 150 which may be somewhat random but preferably represents some estimate of the relative difficulty of packing of the individual tasks. The accuracy of this initial order is not at all critical since the order will be rearranged in accordance with the operation of the invention as will be described in greater detail below. This order is also stored (160) as a "best so far" solution which will usually be replaced in the course of the allocation process but could, conceivably, be the order of items which leads to an optimal allocation which satisfies the initial and most comprehensive objective. Finally, the storage for orders which reflect a limit cycle is cleared (170). The process can now proceed to an initial execution of a bin packing or sequential assignment algorithm as detailed in FIG. 3.

Figure 3:
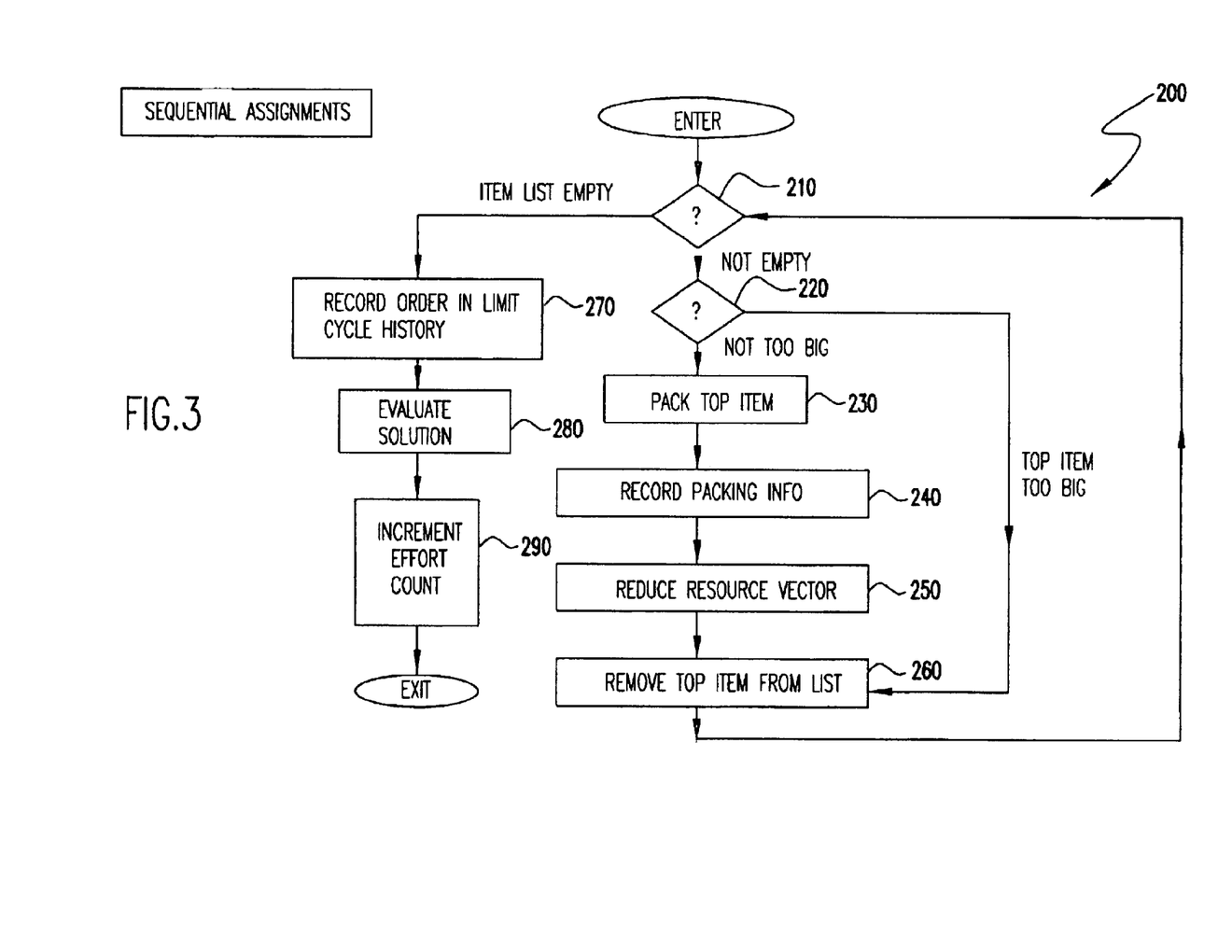
FIG. 3 is a flowchart of the Sequential Assignments portion of FIG. 1.

FIG. 3 shows detail on the Sequential Assignments portion 200, which assigns items (tasks) by any of several sequential packing techniques (the details of which are not critical to the successful practice of the invention), item by item, starting at the top of the item list and proceeding down until the item list is empty, as determined at 210. Any packing criterion (such as First Fit, Best Fit, Worst Fit, Almost Worst Fit, etc.) is used at 230, but any item which can not be packed with remaining resources is removed at 220 in a manner similar to step 120, discussed above. Step 220 may be merged with step 230 as part of a single process. At step 240, the packing selection is recorded and at step 250 the resource vector representing the remaining resource of the selected "bin" (balance or unused portion of the computer/processor to which the current allocation is made) is reduced to reflect that consumed by the assignment. In all cases, the top item on the list is removed at 260 and control is passed back to 210, which eventually passes control to 270. At 270, the list of all sequential assignments made by the loop 210–260 are recorded for future Limit Cycle detection and handling at 600. The list of sequential assignments is evaluated at 280 according to the current objective and goal. At 290, the Effort Counter (e.g. processor time, process iteration number, etc.) is incremented for future consideration at 440.

At 300 (FIG. 1), the best solution, in terms of the defined goal and objective function, is updated at each iteration. This function is achieved in a simple and straightforward manner by following the hierarchical prioritization of the list of goals in determining the current objective and scoring the solution in accordance with the current goal. This insures that the final solution is always the best found and therefore never under performs the Sequential Assignment solution used for initialization. It is imperative to keep track of both the solution (list of assignments) and the evaluated score.

Figure 4:
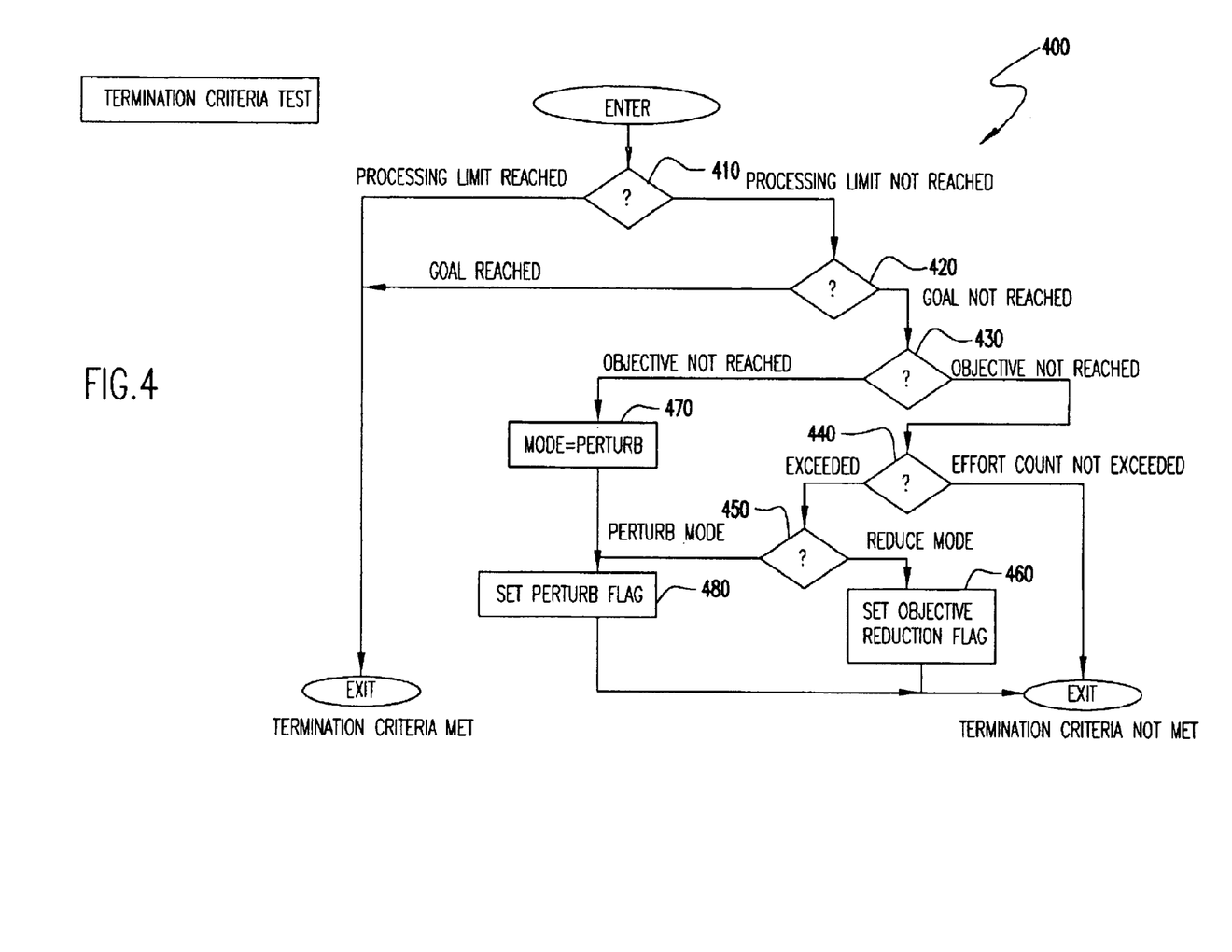
FIG. 4 is a flowchart of the Termination Criteria Test portion of FIG. 1.

FIG. 4 shows detail of the Termination Criteria Test portion 400. Further processing is terminated by transferring control to 1000 if a prescribed Processing Limit is reached (410) or if the Goal is reached (420), otherwise processing is not terminated, but continues to 430. If the current objective has been reached (430), the Perturbation Mode is entered (470) and a flag is set (480) for further consideration at 810. Otherwise, control is passed to 440 where the Effort Count is compared to a prescribed limit and if the limit has been reached, control is passed to 450, At 450 either the Perturb Flag or an Objective Reduction Flag is set depending on the current mode tested by 450. These flags are used by subsequent processing.

At 500, Percolate Unassigned, the order of the items being processed is altered so as to elevate those items which were not successfully packed. The elevation consists of moving the unassigned items up in the list so they will be processed earlier in the next Sequential Assignment cycle 200. The elevation may be for any combination (from one to all) of the unassigned items and the movement may be as small as one step up to stepping all the way to the top of the list. Selection is governed by a trade: Moving multiple items and using longer steps speed the transition to a nearly randomized search but may miss some possibly optimal list orders.

For most iterations, sequential assignments and percolation proceed without interruption. However, to avoid being caught in a limit cycle, to avoid stalling on unattainable objectives, and to improve upon solutions which attain a reduced objective short of the most comprehensive goal, additional logic, as described in 600–1000, is added to percolation.

Figure 5:
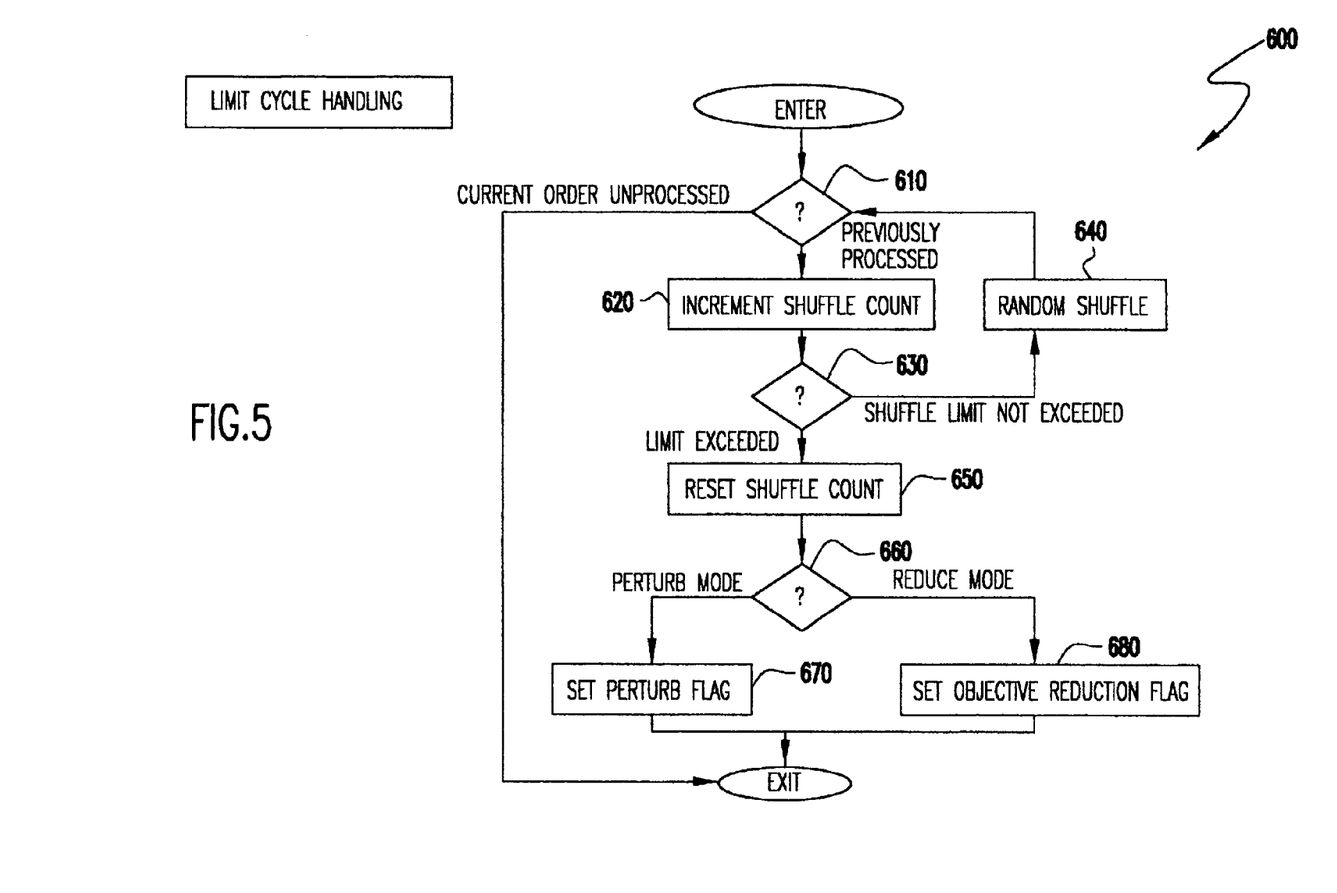
FIG. 5 is a flowchart of the Limit Cycle Handling portion of FIG. 1.

FIG. 5 details the Limit Cycle Handling 600 which forces the search out of repetitive loops. At 610, further Limit Cycle Handling processing is bypassed unless the latest set of assignments duplicates some previous set of assignments contained in the Limit Cycle History, The loop of 610, 620, 630, 640 randomly shuffles the list until some order not contained in the Limit Cycle History is obtained, or until some prescribed limit is reached (630). If random shuffling does not attain an unprocessed order within the allowed count, the Shuffle count is reset to zero (650) and either the Perturb Flag or the Objective Reduction Flag is set depending upon the mode (660, 670, 680).

Figure 6:
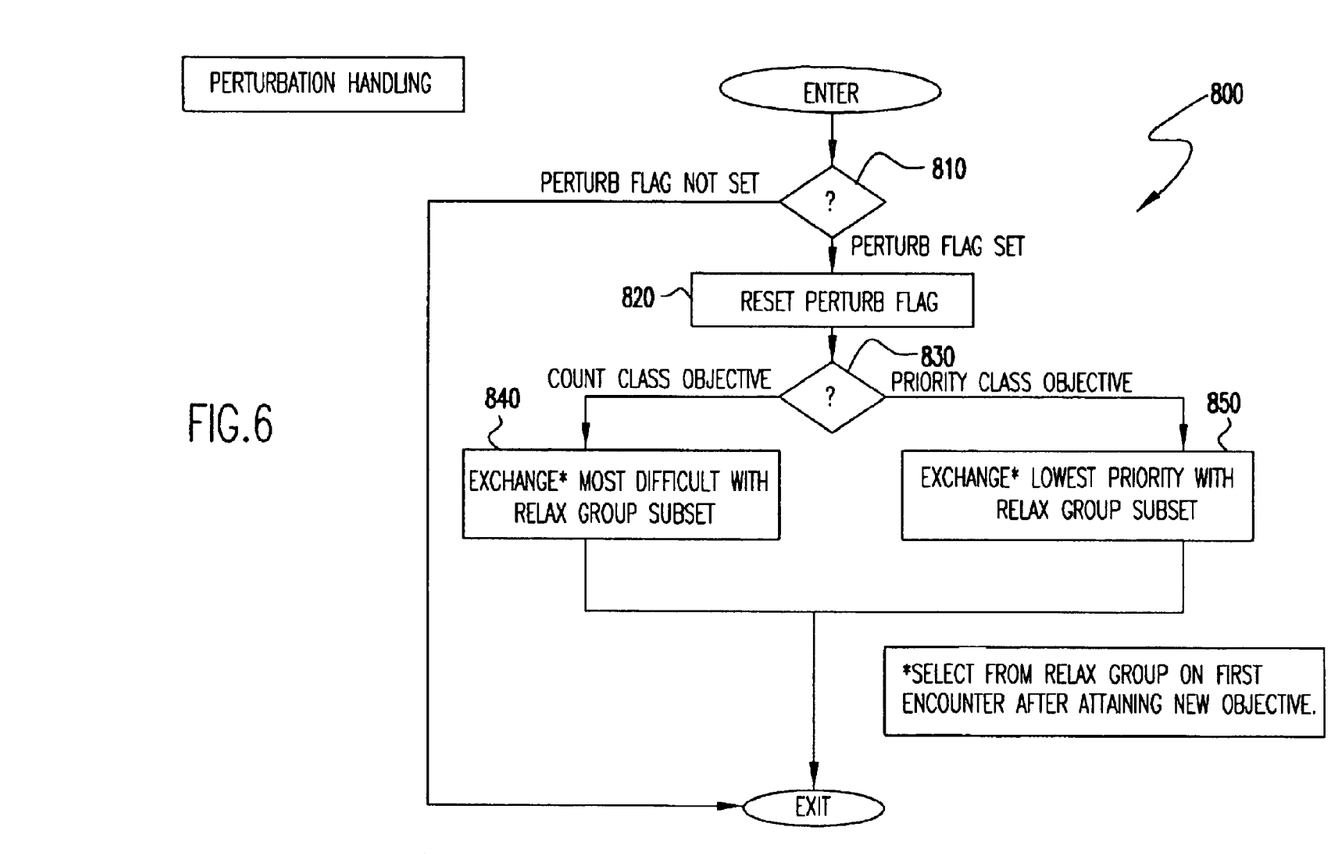
FIG. 6 is a flowchart of the Perturbation Handling portion of FIG. 1.

FIG. 6 details the Perturbation Handling at 800 which either attempts to improve a solution which has met the current objective but not the most comprehensive goal (perturb mode), or alter a list for which an apparent stall has been developed (reduce mode). The Perturbation Handling is bypassed at 810 unless the Perturb Flag has been set, otherwise the Perturb Flag is reset at 820 and the current list of items to process is changed by adding or exchanging items with the Relaxed Group (which is initially empty but otherwise accumulated by Reduce objective at 900). Which items are exchanged and/or selected depends on the type of objective that is being optimized (830). In the Reduce mode, for those objectives which are primarily concerned with the total number of assigned items (tasks), the more troublesome items in the current (solution) list are exchanged with members of the Relaxed Group (840), but for priority class objectives (those where task priority is most important), lowest priority tasks are exchanged with members of the Relaxed Group (850). In the Perturb mode, that is, when the current objective has been attained but the most comprehensive goal has not, selections from the Relax Group are added without exchange on an encounter with 840 and 850 immediately following attainment of a new objective. Subsequent encounters involve exchanges unless a new objective closer to the most comprehensive goal has been attained since the last visit to 840 or 850. Either patterned or random selections may be used, but in either case, the processing limits set in 400 always terminate processing, so no special attention is required here to avoid cyclical exchanges introduced at either 840 or 850, but such logic could be included if desired or found effective in particular circumstances.

Figure 7:
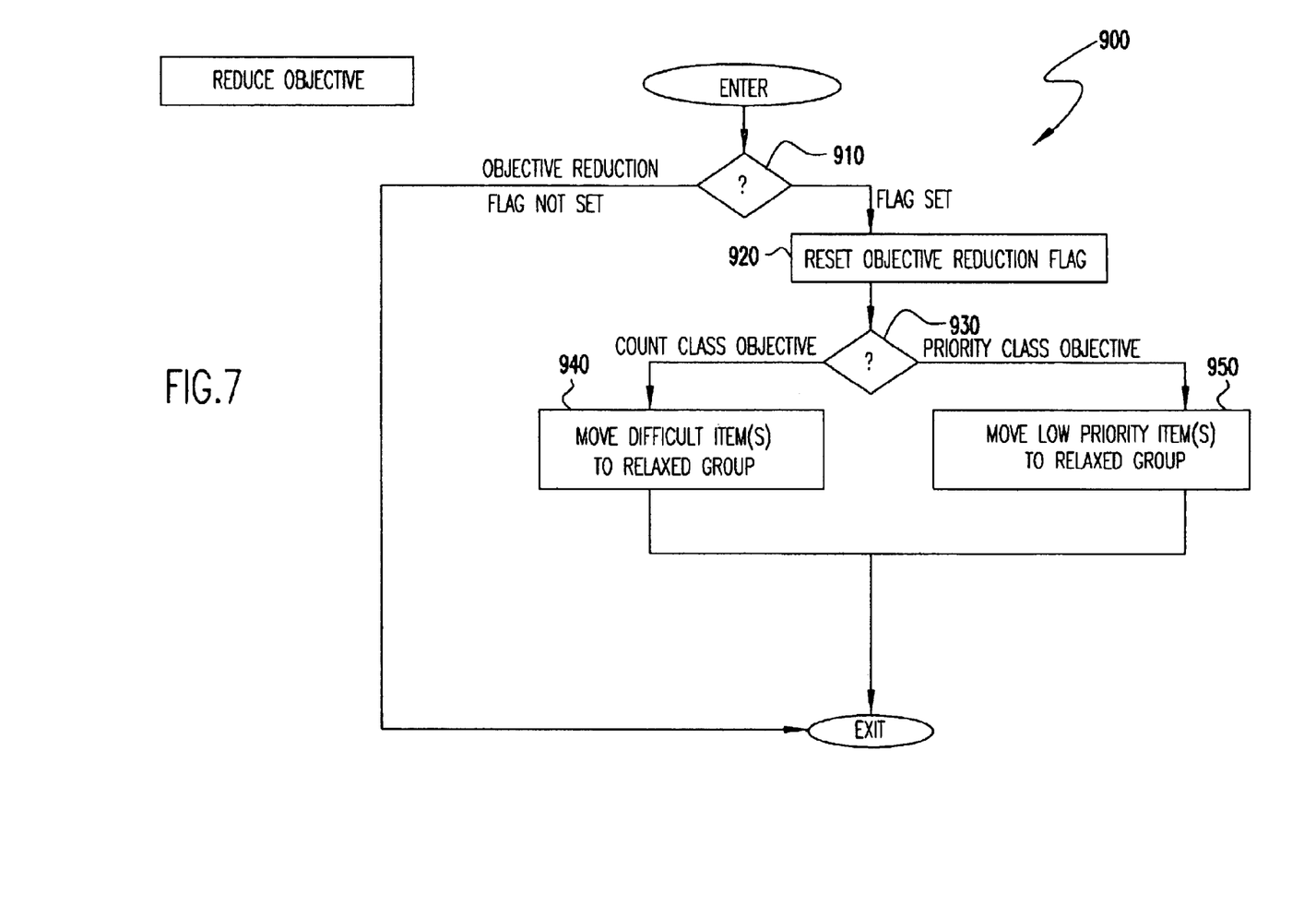
FIG. 7 is a flowchart of the Reduce Objective portion of FIG. 1.

FIG. 7 details the Reduce Objective processing at 900 which reduces the objective when too much effort is being spent trying to attain an apparently unattainable objective, that is whenever the Objective Reduction Flag is set (910). This flag is reset at 920 and then items are moved from the current list to a Relaxed Group (which is initially empty), but which items are selected is governed by the type of objective being optimized (930). For Count Class objectives, the most difficult items are moved to the Relaxed Group (940), but for Priority Class objectives, the task(s) moved are those of lowest priority (950). At 1000, the best solution is recalled and becomes the final solution.

In view of the foregoing, it is seen that the invention provides a relatively simple technique and apparatus for optimal allocation of jobs or tasks among computers or computer systems to achieve maximal throughput and/or maximal resource utilization. A more thorough search of the search space while avoiding processing difficulties that limit the search or cause unproductive processing time are avoided through flexible reordering of items to be allocated and item deletion from the list of items to be allocated. The invention is thus enabled to accommodate complex item and capacity vectors such as are particularly characteristic of data processing resources of extensive computer systems and networks and, by the same token, are applicable to complex matching problems in other fields.

While the invention has been described in terms of its preferred embodiments, those skilled in the art will recognize that the invention can be practiced with modification within the spirit and scope of the appended claims.

What is claimed is:

1. A computerized system for packing a plurality of items into a plurality of computer systems to maximize overall system utilization, the system comprising:
   a computer; and
   an executable program with instructions to implement a method comprising steps of:
   sorting the items into an estimated order of difficulty of packing said items into the computer systems;
   packing said items in order until no more items can be packed; and at least one of
   reordering the estimated order of difficulty using a percolation method in which said estimated order of packing difficulty of unallocated items is changed as knowledge of apparent packing difficulty is increased based on results of said packing step until a limit cycle occurs or the packed items run on the computer systems according to a pre-specified goal; and
   reordering the estimated order of difficulty using a randomizing method.

2. A method for packing a plurality of items into a plurality of computer systems to maximize overall system utilization whereby each one of the plurality of items may have resource requirements different from at least one of the other of the plurality of items, each one of the plurality of computer systems may have resources different from at least one of the other of the plurality of computer systems, and the items are tasks to be performed periodically, the method comprising the steps of:
   applying the method prior to execution of the plurality of items to determine an optimum distribution of the plurality of items to the plurality of computer systems:
   establishing a hierarchical set of pre-specified goals against which a pre-specified goal of the distribution of the plurality of items is to be compared;
   representing each one of the plurality of items by one vector containing said one of the plurality of items' resource requirements and creating thereby a plurality of item vectors and representing each one of the plurality of computer systems by one vector containing the one of the plurality of computer systems' resources and creating thereby a plurality of computer system vectors;
   record current item order for future detection of limit cycle;
   ordering the plurality of item vectors in an estimated order of difficulty of packing said plurality of items to said plurality of computer systems;
   disregarding any item which cannot be packed into any of the said plurality of computer systems;
   packing the one of the plurality of items with the greatest difficulty of packing to one of the plurality of computer systems with resources greater than or equal to the resource requirements of said computer system using any existing packing method;
   recording in a data location the one of the plurality of computer systems to which the one of the plurality of items was packed or to which one of the plurality of items was not indicated as packed if not yet packed;
   removing the packed one of the plurality of items from the ordered plurality of vectors and revising the vector for the one of the plurality of computer systems upon which the one of the plurality of items is packed;
   repeating the packing, recording, and removing steps until all of the plurality of items have been packed;
   comparing the packing solution against a pre-specified goal;
   halting the process if the packing solution is optimum relative to the pre-specified objective, otherwise applying one of a plurality of percolation techniques to the estimated order of difficulty of packing said plurality of items to said plurality of computer systems, performing limit cycle detection, and repeating all the above steps starting with the packing step until either an optimum solution is found or a limit cycle occurs.

3. The method of claim 2, further comprising:
   recording a history of all of said item orders processed;
   comparing percolated item order with said recorded history to detect the presence of a revisited state of processed item order, that is, a limit cycle;
   randomly and repeatedly reordering the current item order until some order not recorded in the history is achieved.

4. The method of claim 2, further comprising:
   halting the process at one terminal condition selected from the list of terminal conditions comprising as follows:
   a pre-specified time of day;
   a pre-specified period of execution of the process;
   a pre-specified number of iterations of the process; and
   a pre-specified proximity of a solution to a pre-specified optimum solution.

5. The method of claim 2 wherein the percolation technique used to reorder the order of difficulty of packing the plurality of items is a percolation technique selected from the following:
   move all unpacked items to the head of the order;
   move one unpacked item to the head of the order;
   elevate all unpacked items by a pre-specified increment in the order; and
   elevate one unpacked item by a pre-specified increment in the order.

6. The method of claim 2 wherein a random method as used to reorder the estimated order of difficulty.

7. The method of claim 2 wherein, upon failure of the method to pack all of the plurality of items into the plurality of computers, at least one unpacked item is deleted from the estimated order of difficulty and the method is restarted, said unpacked item being chosen for deletion using a rule selected from the following list of rules:
   selecting the items of lowest priority to delete; or
   selecting for deletion the unpacked item at the top of the estimated order of difficulty.

8. The method of claim 2, further comprising:
   recording a history of a predefined number of the most recent item orders processed;
   comparing percolated item order with said recorded history to detect the presence of a revisited state of processed item order to detect a limit cycle;
   randomly and repeatedly reordering the current item order until some order not recorded in the history is achieved.

9. A method comprising steps of
   sorting the items into an estimated order of difficulty of packing said items into the computer systems;
   packing the items until no more items can be packed; and at least one of:
   reordering the estimated order of difficulty using a percolation method in which said estimated order of packing difficulty of unallocated items is changed as knowledge of apparent packing difficulty is increased based on results of said packing step until a limit cycle occurs or the packed items run on the computer systems according to a pre-specified goal; and reordering the estimated order of difficulty using a randomizing method.

10. A method as recited in claim 9, wherein said method is terminated based on an effort value.

11. A method as recited in claim 10, wherein said effort value corresponds to a time.

12. A method as recited in claim 10, wherein said effort value corresponds to a number of iterations of said packing step.

13. A method as recited in claim 10, wherein said effort value corresponds to processing time of said method.

14. A method as recited in claim 9, including a further step of deleting items which cannot be packed in accordance with available resources.

15. A method as recited in claim 14, wherein an item deleted in said deleting step is accumulated in a relaxed list.

16. A method as recited in claim 15, including the further steps of detecting when a goal has been met, forming a list of packed items responsive to said detecting step, and exchanging an item in said list of packed items with an item in said relaxed list.

* * * * *